(12) United States Patent
Clifford et al.

(10) Patent No.: US 7,123,698 B1
(45) Date of Patent: Oct. 17, 2006

(54) AUTOMATIC PAYMENT SYSTEM AND METHOD

(75) Inventors: Jeremy Clifford, Arlington, VA (US); Scott Lee Dalla Valle, Glen Allen, VA (US); Nathan Tad Czyzewski, Arlington, VA (US)

(73) Assignee: Capital One Financial Corporation, McLean, VA (US)

( * ) Notice: Subject to any disclaimer, the term of this patent is extended or adjusted under 35 U.S.C. 154(b) by 425 days.

(21) Appl. No.: 10/180,366

(22) Filed: Jun. 26, 2002

(51) Int. Cl.
*H04M 11/06* (2006.01)

(52) U.S. Cl. .............................. 379/88.18; 379/201.05; 705/1; 705/74

(58) Field of Classification Search ............. 379/88.16, 379/88.18, 114.15, 114.16, 145; 705/40
See application file for complete search history.

(56) References Cited

U.S. PATENT DOCUMENTS

| | | | | |
|---|---|---|---|---|
| 5,465,206 A | * | 11/1995 | Hilt et al. ..................... 705/40 |
| 5,499,288 A | * | 3/1996 | Hunt et al. ............... 379/88.02 |
| 5,717,868 A | * | 2/1998 | James ......................... 705/35 |
| 5,825,856 A | * | 10/1998 | Porter et al. ............. 379/93.12 |
| 5,873,072 A | * | 2/1999 | Kight et al. .................. 705/40 |
| 6,282,523 B1 | * | 8/2001 | Tedesco et al. ............... 705/45 |
| 6,516,056 B1 | * | 2/2003 | Justice et al. ............... 379/145 |
| 2002/0087344 A1 | * | 7/2002 | Billings et al. ................. 705/1 |
| 2002/0198782 A1 | * | 12/2002 | Shorter ........................ 705/14 |
| 2003/0183689 A1 | * | 10/2003 | Swift et al. ................. 235/380 |

OTHER PUBLICATIONS

Fort Belvoir Federal Credit Union, "Automatic Pay for Visa Credit Cards", 2002, http://www.ftbfcu.org/onlineserv/atomaticpay.html.

* cited by examiner

*Primary Examiner*—Gerald Gauthier
(74) *Attorney, Agent, or Firm*—Baker & McKenzie LLP

(57) ABSTRACT

System and method for enrolling in an automatic payment plan using an electronic signature and for granting an account benefit based on the enrollment.

17 Claims, 3 Drawing Sheets

AUTOMATIC PAYMENT SYSTEM AND METHOD

FIELD

The present application relates to an automatic payment system and method and, more particularly, to a system and a method for account holders to have automatic payments deducted from another account upon submitting an electronic authorization signature.

BACKGROUND

Cards, such as credit cards, smart cards, debit cards and automated teller machine ("ATM") cards having credit limits associated therewith, offer a tremendous amount of convenience to account holders by allowing the account holders to make one or more purchases, for instance, when not having the necessary funds. For most people credit is essential for big-ticket items such as homes, automobiles, appliances or educational purposes. Few people have enough cash saved for major purchases. Also, some households lack adequate emergency funds to cover unexpected expenses. Having credit available during times of financial emergencies can be important. Credit is a convenience, but credit is not free—financing adds to the total cost. Overspending is more likely to occur because credit is convenient to use and, as a result, some people fall into the trap of impulse spending rather than planned spending. There is also the tendency to look only at the required minimum monthly payment and not the total amount of the debt. Borrowers are liable for their debts regardless of changes that occur in the future. Payments need to be submitted for such accounts by a due date on a recurring basis assuming a balance remains for the respective account.

Various institutions allow account holders to authorize recurring withdrawals from an account, such as from a checking account, to pay a recurring bill due for another account of the account holder. In order to authorize and activate the recurring withdrawals, the account holder executes a document sent to the account holder by the respective institution or downloads the document from a website. The account holder sends the completed and signed document to the respective institution to activate the recurring withdrawals. Further, the account holder often has to provide to the institution a blank, voided check for the respective checking account. Due to the additional steps of having to receive/download the document and then having to complete, sign and send back the document, many account holders never activate the recurring withdrawals.

Additionally, voice response units enable account holders to access card information using a conventional touch tone telephone. The interaction between the account holders and the voice response unit includes various voice prompts, output by the voice response unit and responses thereto, for example, via the telephone keypad, by the account holder. Voice response units are used by service providers, such as banks and card companies, to fully or partially automate telephone call answering or responding to queries. Typically a voice response unit provides the capability to play voice prompts including recorded voice segments or speech synthesized from text and to receive responses thereto. The voice prompts are generally organized in the form of voice menus invoked by state tables. A state table can access and play a voice segment or synthesize speech from given text. The prompts are usually part of a voice application that is designed to, for example, allow a account holder to query information associated with their various accounts.

Further, voice response units are used in a variety of applications today to resolve account holder problems and questions in conjunction with customer service representatives. In a financial service industry, such voice response units often provide account holders general information via one or more automated messages. Usually, the account holder is also given the option to either bypass an automated message or after the automated message has concluded to interact with a customer service representative in order to receive more detailed information tailored to an account of the account holder.

Accordingly, a need exists for a system and a method that allows an account holder to enroll in an automatic payment plan during a telephone call without having to receive, execute and send back a form and to increase a credit limit associated with the account and/or receive another account benefit as a result of enrolling in the automatic payment plan.

SUMMARY OF THE INVENTION

An aspect of the present application provides for an automatic payment method. The method includes receiving a request from an account holder during a telephone call to enroll in an automatic payment plan for a first account, the automatic payment plan operable so that a payment due for the first account during a billing period is automatically debiting from a second account of the account holder, transmitting to the account holder at least one automated signature question via a voice response unit during the telephone call in order to enroll in the automatic payment plan, receiving at least one answer to the at least one automated signature question during the telephone call via the voice response unit, the at least one answer constituting a signature needed to enroll in the automatic payment plan, verifying that the at least one answer is valid, activating the automatic payment plan for the first account if it is determined that the at least one answer is valid, and determining an account benefit because of the account holder being enrolled in the automatic payment plan, if it is determined that the at least one answer is valid.

Another aspect of the present application provides for an automatic payment method. The method includes activating a first account during a telephone call from an account holder, receiving a request from the account holder during the telephone call to enroll in an automatic payment plan after activating the first account, the automatic payment plan operable so that a payment due for the first account during a billing period is automatically debiting from a second account of the account holder, transmitting to the account holder at least one automated signature question via a voice response unit during the telephone call in order to enroll in the automatic payment plan, receiving at least one answer to the at least one automated signature question during the telephone call via the voice response unit, the at least one answer constituting a signature needed to enroll in the automatic payment plan, verifying that the at least one answer is valid, activating the automatic payment plan for the first account if it is determined that the at least one answer is valid, and determining an account benefit because of the account holder being enrolled in the automatic payment plan, if it is determined that the at least one answer is valid.

A further aspect of the present application provides for an automatic payment system, including a user interface, the user interface operable by an account holder for submitting a request to enroll in an automatic payment plan for an account, an automatic payment determination unit coupled to the user interface for receiving the request, for providing to the account holder at least one signature question, at least one answer to the at least one signature question constituting a signature needed for enrolling in the automatic payment plan, for receiving the at least one answer and for determining whether the at least one answer is valid, and a credit determination unit for determining an account benefit because of the account holder being enrolled in the automatic payment plan, if it is determined that the at least one answer is valid.

DETAILED DESCRIPTION

The exemplary embodiments of the present application are described with reference to cards, such as credit cards, debit cards having a credit line and ATM cards having a credit line, and their associated accounts. Cards and their associated accounts, however, are merely illustrative and are not meant to limit the present application. For instance, the exemplary embodiments can also be described with reference to other card accounts, mortgages, installment loans, utility accounts and any other account that requires payment at regular intervals. Also, the exemplary embodiments can be described with reference to various institutions managing such accounts besides banks and credit card companies.

Figure 1:
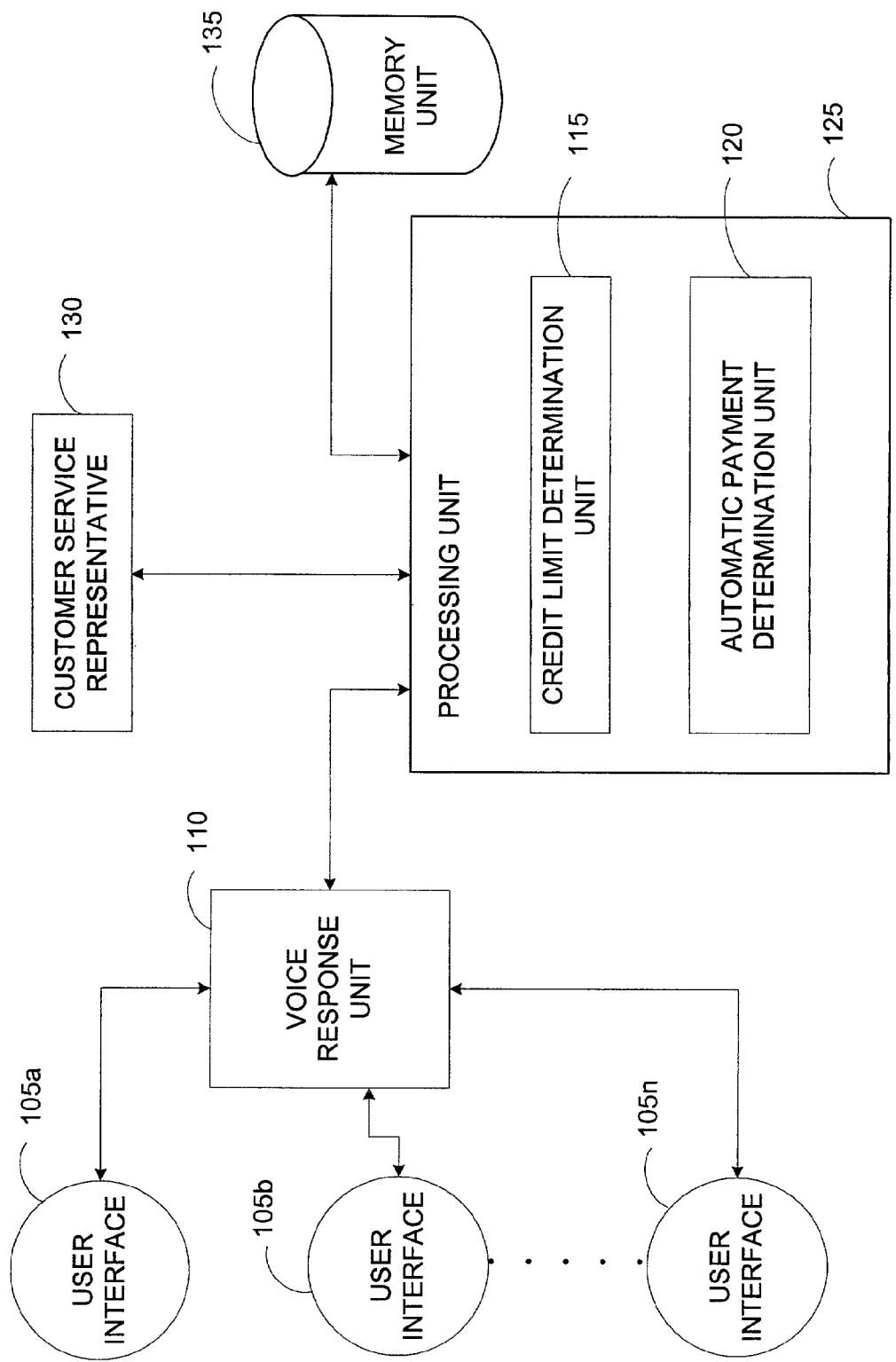
FIG. 1 illustrates an exemplary automatic payment system of the present application.

FIG. 1 depicts an exemplary automatic payment system 100 of the present application. Automatic payment system 100 includes user interfaces 105a . . . 105n coupled to processing unit 115 via voice response unit 110. Processing unit 115 includes automatic payment determination unit 120 and credit limit determination unit 125, processing unit 115 also being coupled to memory unit 135 and customer service representative 130.

In an exemplary embodiment, user interfaces 105a . . . 105n are operable as communication devices, such as a wired or wireless telephones and/or network connections, for example, Internet connections, via a wireless or wired transmission link to transmit information to and to receive information from processing unit 115. Other communication devices can also be used. An account holder interacts with voice response unit 110 using one of user interfaces 105a . . . 105n in order to transmit information to and receive information from processing unit 115. Further, memory unit 135 can include various types of memory storage devices, for example, one or more databases. Memory unit 135 can store, for example, account data such as account holder identity data, balance data and credit limit data, signature question data, and data regarding one or more automatic payment plans.

Automatic payment determination unit 120 of processing unit 115 determines, for example, whether a request to enroll in an automatic payment plan is valid, as described below, and credit limit determination unit 125 determines, for example, whether to increase a credit limit associated with a respective account, as described below.

The components of FIG. 1 may be implemented through hardware, software, and/or firmware. The number of components in automatic payment system 100 is not limited to what is illustrated.

Figure 2:
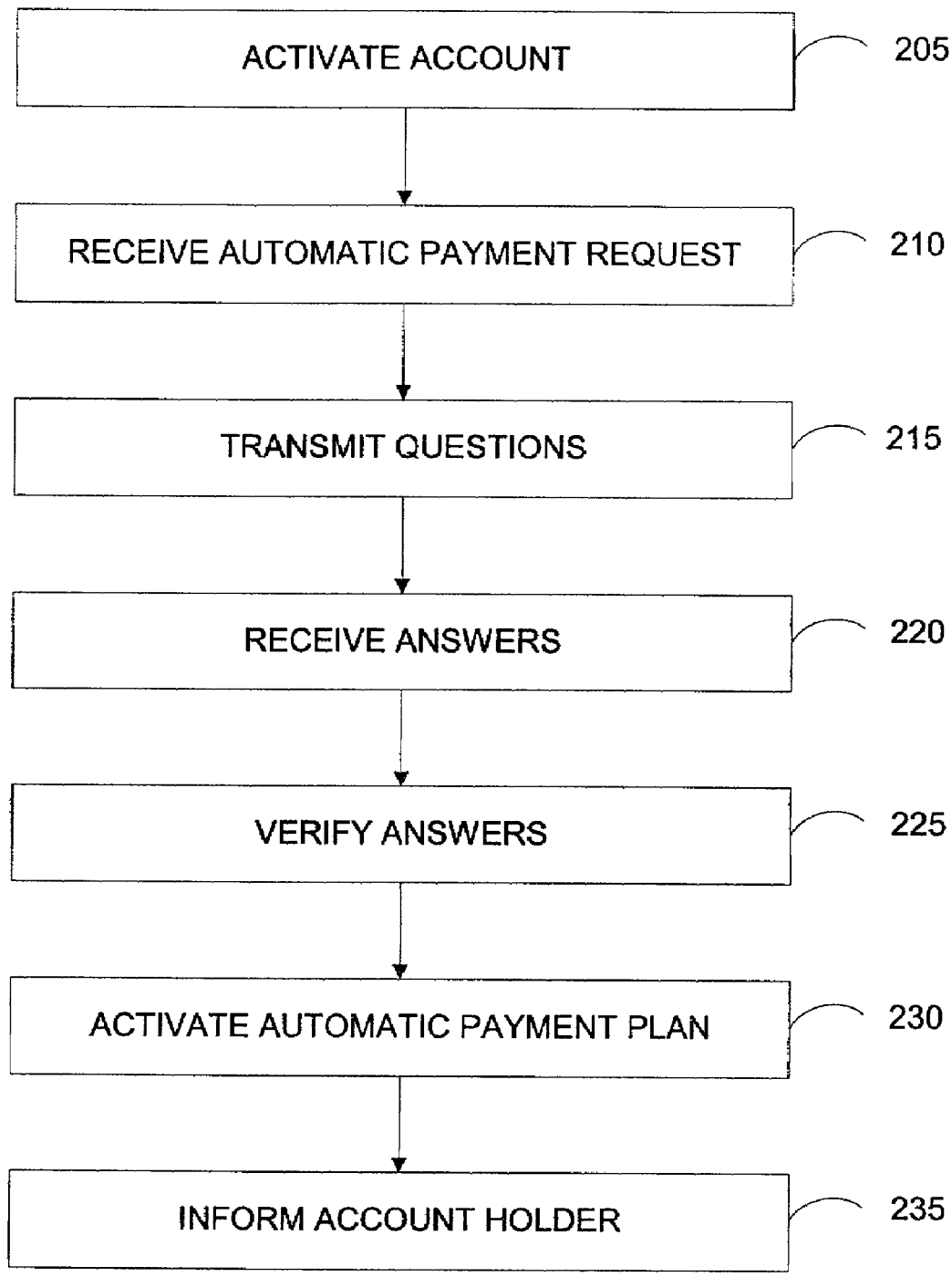
FIG. 2a illustrates an exemplary flow diagram for activating automatic payment.
FIG. 2b illustrates an exemplary flow diagram for activating automatic payment and increasing a credit limit.
Figure 2:
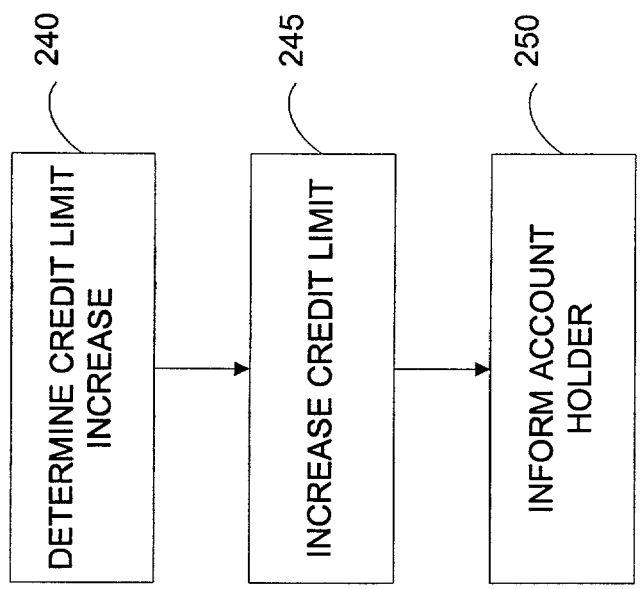

FIGS. 2a and 2b illustrate an exemplary flow diagram for activating an automatic payment plan and increasing a credit limit associated with the account. The exemplary flow diagrams of FIGS. 2a and 2b are described with reference to an account holder transmitting information to and receiving information from processing unit 115 using a telephone, wireless or land line. The present application, however, is not limited to using telephones, rather any other communication device can be used by an account holder. An account holder first activates an account, in 205. In an exemplary embodiment, the account holder activates an account by contacting processing unit 115 via voice response unit 110 and responding to at least one automated message by voice response unit 110. For instance, the at least one automated message requests the account holder to input a plurality of predetermined numbers, such as an account number and a personal identification number. Alternatively, customer service representative 130 also participates in the account activation process or is responsible for activation without involvement of voice response unit 110. The responses by the account holder to the one or more automated messages from voice response unit 110 and/or the one or more questions by customer service representative 130 are verified by processing unit 115 by accessing account data stored in memory unit 135 associated with the respective account of the account holder.

During the telephone call by the account holder to activate the account, the account holder submits a request to processing unit 115 to enroll in an automatic payment plan, for example, in response to an offer by customer service representative 130 or an offer set forth in an automated message from voice response unit 110. Alternatively, the account holder can enroll in the automatic payment plan at any point during the relationship. In further alternative embodiments, the account holder is presented the automatic payment plan option after the account holder requests a credit limit increase and/or the company offering the automatic payment plan proactively targets the plan to account holders via a mailing.

The automatic payment request is received by automatic payment determination unit 120, in 210. In an exemplary embodiment, the automatic payment plan causes a recurring debit or withdrawal, for instance, every billing period, from an account associated with an account holder, such as a checking account. As a result, the account holder does not have to manually submit payment by a payment due date. For example, an automatic payment plan can be arranged so that during each billing period for an account, processing unit 115 debits an amount of money from a checking account of the account holder in order to pay at least a minimum amount due for the account. The amount of money can be a predetermined amount of money debited from the checking account each billing period regardless of the minimum amount due or the balance of the account, the minimum amount due for a billing period which can change from billing period to billing period or an amount of money equal to the balance of the account which can also change from billing period to billing period. Various automatic payment plans can be arranged and offered to an account holder. Further, an account holder can be given the choice of changing between two or more automatic payment plans.

In order for the account holder to enroll in an automatic payment plan that causes recurring debits from an account, the account holder submits information to processing unit 115 validated by an electronic signature during the account activation telephone call. For example, the information includes data regarding the other account, such as a bank routing number, account (e.g. checking) number and account type, i.e., whether personal or business. The information submitted by the account holder also includes the type of automatic payment plan the account holder wants to enroll in, for example, minimum amount payment plan, full amount payment plan or fixed amount payment plan, assuming the account holder is given a choice of choosing between two or more plans. If the account holder chooses a fixed amount payment plan, the account holder submits to processing unit 115 the amount of money to be debited on a recurring basis from the account.

The submitted information is validated by an electronic signature of the account holder. Specifically, automatic payment determination unit 120 transmits at least one automated signature question to the account holder via voice response unit 110, in 215. In an exemplary embodiment, data for the automated signature questions is stored in memory unit 135. For instance, after the account holder hears the terms and conditions of the automatic payment plan via voice response unit 110, the account holder is asked at least one signature question, for example: "If you accept the terms and conditions of the automatic payment plan, please press or say 1." In this example, pressing or saying "1" constitutes the account holder's electronic signature. One or more other questions, and manners of answering those questions, can be asked of the account holder in addition to or besides the above exemplary signature question. Alternatively, customer service representative 130 presents the signature question or questions to the account holder during the account activation call.

As will be appreciated by a person having ordinary skill in the art, an electronic signature has the same legal effect as a manual signature assuming any legal signing requirements particular to electronic signatures are complied with. For instance, an electronic signature may need to comply with one or more government enacted acts or rules, such as the Electronic Signatures in National and Global Commerce Act, the Uniform Electronic Transactions Act and/or the Uniform Rules on Electronic Signatures.

The present application is not limited to any particular type of electronic signature. Thus, validating answering to one or more questions, as described herein, is merely one exemplary type of electronic signature.

The account holder using, for example, user interface 105*a*, inputs the answer to the one or more signature questions. The answer(s) to the one or more signature questions are received by automatic payment determination unit 120, in 220. The answer(s) can be input using a user input device, such as a keypad or touch screen with a stylus, or can be spoken and recognized using voice recognition software and can be presented to customer service representative 130. If applicable, automatic payment determination unit 120 thereafter determines the validity of the answer(s) by searching for and retrieving data stored in memory unit 135 associated with the account holder and the respective account, in 225. If automatic payment determination unit 120 determines that the answer(s) are valid, the automatic payment plan is activated, in 230, and data indicating that the account holder is enrolled in the automatic payment plan is stored in memory unit 135. The account holder is informed of the enrollment, for instance, during the account activation telephone call, in 235. When enrolled in the automatic payment plan, at least the amount due during a billing period is automatically debited from another account associated with the card account, for example, from a checking account. The amount debited from the other account can be a predetermined amount of money during each of a plurality of billing periods, an amount of money equal to a minimum payment due for the card account during each of a plurality of billing periods or an amount of money equal to a balance of the card account during each of a plurality of billing periods.

On the other hand, if automatic payment determination unit 120 determines that at least one answer is not valid, then the account holder is prompted by voice response unit 110 or asked by customer service representative 130 to resubmit the answer(s). Automatic payment determination unit 120 determines the validity of the resubmitted answer(s). Alternatively, if the account holder errors out of voice response unit 110, a written application for the automatic payment plan is sent to the account holder via mail, electronic mail, facsimile or the like.

In an exemplary embodiment, once the account holder is enrolled in an automatic payment plan, credit limit determination unit 125 determines an automatic credit limit increase for the card account, in 240. The credit limit associated with the card account is automatically increased due to the account holder being enrolled in an automatic payment plan. For instance, credit limit determination unit 120 determines the credit limit increase based on the credit risk of the account holder, or the credit limit is increased a fixed, predetermined amount. In an alternative embodiment, voice response unit 110 and/or customer service representative 130 offers a credit limit increase to the account holder for the respective account during or after the activation telephone call during which the account holder enrolled in the automatic payment plan. The account holder can thereafter accept or reject the credit limit increase offer with the decision of the account holder having no effect on the activation of the automatic payment plan. Once the amount of the credit limit increase associated with the account is determined, the respective credit limit is increased, in 245, and data indicating the new credit limit is stored in memory unit 135. The account holder is informed of the credit limit increase, for example, during the account activation telephone call by voice response unit 110 and/or customer service representative 130, or in a mailing from the respective company after the account activation telephone call.

Alternatively, after an account holder enrolls in an automatic payment plan for a card account, a credit limit associated with the card account is not automatically increased and an increase is not offered to the account holder based on the account holder enrolling in the automatic payment plan. The ordering of 205 to 250 is merely exemplary and not meant to limit the present application.

The exemplary embodiments of the present application are not limited to increasing a credit limit based on an account holder enrolling in the automatic payment plan. Rather, other account benefits can be awarded to an account holder besides or in addition to increasing a credit limit when an account holder enrolls in the automatic payment plan. For instance, one or more fees can be waived and an annual percentage rate can be decreased.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. An automatic payment method, the method comprising:
   receiving a request from an account holder during a telephone call to enroll in an automatic payment plan for a first account, the automatic payment plan operable so that a payment due for the first account during a billing period is automatically debiting from a second account of the account holder;
   transmitting to the account holder at least one automated signature question via a voice response unit during the telephone call in order to enroll in the automatic payment plan;
   receiving at least one answer to the at least one automated signature question during the telephone call via the voice response unit, the at least one answer constituting a signature needed to enroll in the automatic payment plan;
   verifying that the at least one answer is valid;
   activating the automatic payment plan for the first account if it is determined that the at least one answer is valid; and
   determining an account benefit because of the account holder being enrolled in the automatic payment plan, if it is determined that the at least one answer is valid.

2. The automatic payment method as set forth in claim 1, wherein
   determining the account benefit includes determining a credit limit increase for the first account.

3. The automatic payment method as set forth in claim 1, wherein
   determining the account benefit includes determining an annual percentage rate decrease for the first account.

4. The automatic payment method as set forth in claim 1, wherein
   determining the account benefit includes determining at least one fee to be waived.

5. The automatic payment method as set forth in claim 2, wherein
   determining the credit limit increase includes increasing the credit limit a fixed, predetermined amount.

6. The automatic payment method as set forth in claim 2, wherein
   determining the credit limit increase includes determining a credit risk of the account holder and increasing the credit limit an amount based on the credit risk.

7. The automatic payment method as set forth in claim 1, wherein
   the at least one automated question includes a question asking the account holder whether the account holder agrees with one or more terms and conditions, an answer to the question in the affirmative constituting an electronic signature.

8. The automatic payment method as set forth in claim 1, wherein
   the automatic payment plan debits the second account a predetermined amount of money during each of a plurality of billing periods.

9. The automatic payment method as set forth in claim 1, wherein
   the automatic payment plan debits the second account an amount of money equal to a minimum payment due for the first account during each of a plurality of billing periods.

10. The automatic payment method as set forth in claim 1, wherein
    the automatic payment plan debits the second account an amount of money equal to a balance of the first account during each of a plurality of billing periods.

11. The automatic payment method as set forth in claim 1, wherein
    the first account is a credit account.

12. The automatic payment method as set forth in claim 1, wherein
    the first account is a debit account.

13. The automatic payment method as set forth in claim 1, wherein
    the first account is an installment loan account.

14. The automatic payment method as set forth in claim 1, wherein
    the second account is a checking account.

15. The automatic payment method as set forth in claim 1, wherein
    the second account is a savings account.

16. The automatic payment method as set forth in claim 1, wherein
    the second account is a money market account.

17. An automatic payment method, the method comprising:
    activating a first account during a telephone call from an account holder;
    receiving a request from the account holder during the telephone call to enroll in an automatic payment plan after activating the first account, the automatic payment plan operable so that a payment due for the first account during a billing period is automatically debiting from a second account of the account holder;
    transmitting to the account holder at least one automated signature question via a voice response unit during the telephone call in order to enroll in the automatic payment plan;
    receiving at least one answer to the at least one automated signature question during the telephone call via the voice response unit, the at least one answer constituting a signature needed to enroll in the automatic payment plan;
    verifying that the at least one answer is valid;
    activating the automatic payment plan for the first account if it is determined that the at least one answer is valid; and
    determining an account benefit because of the account holder being enrolled in the automatic payment plan, if it is determined that the at least one answer is valid.

* * * * *